United States Patent
Noirjean et al.

(10) Patent No.: US 6,874,931 B2
(45) Date of Patent: Apr. 5, 2005

(54) PORTABLE INSTRUMENT WITH A WRISTBAND PROVIDED WITH ELECTRIC CONNECTION MEANS

(75) Inventors: Pierre-André Noirjean, Develier (CH); Brice Robin, La Chaux-de-Fonds (CH)

(73) Assignee: ETA SA Fabriques d'Ebauches, Grenchen (CH)

( * ) Notice: Subject to any disclaimer, the term of this patent is extended or adjusted under 35 U.S.C. 154(b) by 87 days.

(21) Appl. No.: 10/303,019

(22) Filed: Nov. 25, 2002

(65) Prior Publication Data

US 2003/0099164 A1 May 29, 2003

(30) Foreign Application Priority Data

Nov. 27, 2001 (EP) .............................................. 01204691

(51) Int. Cl.[7] .............................................. G04B 37/00
(52) U.S. Cl. ...................................... 368/282; 368/204
(58) Field of Search ............................. 368/203–205, 368/281–282; 24/265 WS

(56) References Cited

U.S. PATENT DOCUMENTS 5,361,241 A * 11/1994 Ferrara et al. .............. 368/281
5,889,737 A   3/1999 Alameh et al.
2001/0043514 A1  11/2001 Kita

FOREIGN PATENT DOCUMENTS

| CH | 681 267 A3 | 2/1993 |
|---|---|---|
| EP | 669 664 A1 | 8/1995 |

* cited by examiner

Primary Examiner—Kamand Cuneo
Assistant Examiner—Jeanne-Marguerite Goodwin
(74) Attorney, Agent, or Firm—Sughrue Mion, PLLC

(57) ABSTRACT

The portable instrument with a wristband (4) includes an electronic circuit and a rechargeable power source for supplying the electronic circuit with electricity. The wristband includes two electric contact portions (10,11) arranged on a same strand (4) of the wristband and conductive paths (8, 9) connecting the power source. The two electric contact portions (10, 11) are intended to be placed on two complementary conductive portions of an electric charger to allow the power source to be recharged. A loop (12) can be brought into a blocking position above the contact portions (10, 11) to cover and protect them.

8 Claims, 1 Drawing Sheet

PORTABLE INSTRUMENT WITH A WRISTBAND PROVIDED WITH ELECTRIC CONNECTION MEANS

The invention concerns a portable instrument with a wristband, an electronic circuit and a rechargeable power source for supplying electricity to the electronic circuit. The wristband includes two distinct electric contact portions arranged on a same strand of the wristband and means for electrically connecting the contact portions to the power source. The portable instrument can be, for example, an electronic watch that includes a case, in which a watch movement and/or time-keeping circuit, the electronic circuit and the power source are arranged, and a wristband with one or two strands connected to the watchcase. The portable instrument can also be formed of the wristband which includes the rechargeable power source and the electronic circuit.

The invention also concerns a wristband for a portable instrument.

The power source fitted to portable instruments, such as wristwatches, generally has to be changed or recharged as soon as its level of electric supply for the electronic components is no longer sufficient. The frequency with which such a power source is changed or recharged largely depends on the multiple functions that the instrument has to fulfil. In the case, for example of a wristwatch, it may be fitted with means for transmitting and/or receiving radio-frequency signals in addition to the usual elements for the horological functions. These transmission and/or reception means are generally high electric power consumers, even if they are not used continually. Consequently, the power source is discharged relatively quickly. It is thus necessary to be able to change or recharge the power source quickly and easily.

In order to allow a rechargeable power source placed in a case of an instrument to be recharged, it has already been proposed to do this through the case by magnetic coupling. In order to do this, the non-metallic case of the instrument is placed on a support of an electric charger. The power source is charged by inductive coupling between a winding of the charger and a winding integrated in the case of the instrument. Even if the case can remain closed and thus be insulated from the constraints of the environment during these operations, the instrument has to include rectifier means in addition to the magnetic coupling winding, in order to recharge the power source, which constitutes a drawback.

A power source arranged in a case of the instrument may also be recharged via an electrical connector provided on a part of the case. In such case, a charger plug has to be connected to the electrical connector. One drawback of this device lies in the manufacturing costs of the instrument. Moreover, it is relatively complicated to make an electrical connector directly in a part of the case while ensuring the sealing of the components integrated in the case.

The object of the invention is thus to overcome the drawbacks of the prior art by proposing an instrument with simple means for electric connection to an electric charger for recharging a power source of a portable instrument.

Another object of the invention is thus to protect contact portions against constraints of the environment.

These objects, in addition to others, are achieved by a portable instrument with a wristband which includes features mentioned in the claim 1.

One advantage of such a portable instrument according to the invention lies in the fact that only two contact portions are placed on the wristband so as to facilitate connection to an electric charger that includes complementary connection portions. The two portions are distant from each other so as to be able to connect for example a clamp of a charger having complementary portions, and thus to easily recharge the power source. Since the contact portions of the wristband are generally located on the same face of the wristband in contact with the user's wrist, the instrument has to be removed from the user's wrist in order to recharge the power source.

Another advantage of such a portable instrument according to the invention is that the two portions are located on a single strand whether the wristband includes one or two strands. Thus, manufacturing costs are greatly reduced, since the connecting means, such as metallic paths, are integrated in a single strand.

Since the wristband is preferably made in a flexible material, such as rubber, the metallic paths are embedded in the material during manufacture of one of the strands of the wristband.

The metallic paths used as a connection between the contact portions and the power source can also constitute an antenna for reception and/or transmission means of the instrument.

It is to be noted that the portable instrument can be solely a wristband in which a rechargeable power source and an electronic circuit are integrated. The wristband in this case includes only one strand having conventional fastening means at its ends. The wristband can also be formed of extending links in which the insulated electric connection means are arranged.

Another advantage of the instrument according to the invention lies in the fact that a loop of a wristband with two strands can be used to protect the contact portions from the constraints of the environment liable to discharge the power source. The strap loop can be brought into a blocking position above the contact portions when the instrument is worn on a user's wrist. Complementary blocking elements are for example arranged on the strand of the wristband in proximity to the contact portions and on the loop. If the loop is made of a flexible material, such as rubber, it can ensure good insulation, when it is in its blocking position.

The portable instrument is preferably a wristwatch having an analogue or digital type time display. However, the instrument can also be used in the medical field or in the field of communications or telecommunications.

These objects, in addition to others, are also achieved by a wristband which includes the features mentioned in the claim 8.

The objects, advantages and features of the portable instrument with a wristband will appear more clearly in the following description of at least one embodiment illustrated by the drawings, in which.

Figure 1:
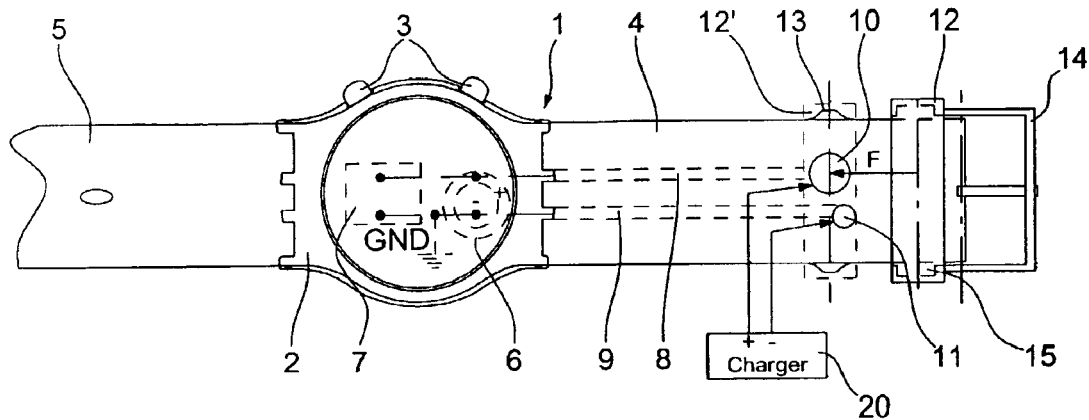
FIG. 1 shows a bottom view of an instrument, such as a wristwatch according to the invention.

With reference to FIG. 1, the portable instrument 1 includes a case 2, a crown or at least a push-button 3, a wristband with two strands 4 and 5 each connected on one side of case 2, a rechargeable power source 6 and an electronic circuit 7 powered by the power source. Electronic circuit 7 and power source 6 are housed in case 2. The instrument is preferably a wristwatch which also includes in the case a watch movement and/or a time-keeping circuit powered by the power source, a dial for a digital time display or analogue time display with hands, and a watch crystal or glass closing the case. These well known elements of the watch are not illustrated so as to avoid overloading the Figures.

In this embodiment, the wristband includes a first strand 4 having, at one end, a buckle 14 and a tongue, and a second strand 5 provided with holes for fastening strand 5 to the buckle with a tongue of strand 4. First strand 4 includes two electric contact portions 10 and 11 connected by connection means 8 and 9 to power source 6 arranged in case 2.

The connection means are formed of two, for example metallic, conductive paths 8 and 9, which are each connected to a corresponding portion. Metallic paths 8 and 9 are integrated in strand 4 of the wristband which can be made of rubber, leather or any of the flexible insulating material. These metallic paths 8 and 9 pass through case 2 in a sealed manner to connect the positive and negative terminals GND of the power source, such as an accumulator or a battery. However, it may also be envisaged that at the end of strand 4 on the side of case 2, metallic paths 8 and 9 come into contact with metallic pads of case 2 each connected to the power source.

Electric contact portions 10 and 11 are arranged on the same face of the wristband which comes into contact with a user's wrist. These portions can be two conductive socket means, such as pots or sockets, 10 and 11 integrated in the thickness of the wristband and slightly set back from the surface of the wristband in order not to come into direct contact with the user's wrist. This prevents the power source being discharged via direct contact of the conductive pots or sockets with the user's skin.

During a recharging operation of power source 6 by a charger 20, the wristband is first of all removed from the user's wrist. Two electric contact pins of the charger, which are not shown, are inserted into the two corresponding conductive pots or sockets 10 and 11. Conductive pots or sockets 10 and 11, as well as the pins of charger 20 that have to each be inserted in a corresponding plot, have a different diameter to prevent any erroneous connection of the positive and negative terminals of charger 20 (foolproof device). Conductive pots or sockets 10 and 11 are coated with a gold plating to ensure a better electric contact with the pins of charger 20.

Even if these pots or sockets are slightly set back from the surface of the wristband, this does not entirely ensure that a user's skin will not come into contact with the two pots or sockets 10 and 11, if the wristband is tightened around the user's wrist. Moreover, it may happen that dirt, perspiration or water contacts the two conductive pots or sockets and thus discharges the power source relatively quickly. Strap loop 12 is thus used to cover and protect said conductive pots or sockets when the instrument is worn on the wrist.

In FIG. 1, loop 12 is mounted free of movement in a position set back from contact portions 10 and 11 to allow any pins of a charger to be connected in pots or sockets 10 and 11 for recharging the power source. Loop 12 can also be moved in a direction F to a blocking position 12' shown in dotted lines in the Figure.

In order to ensure the loop 12 is blocked when it covers contact portions 10 and 11, complementary blocking elements 13 and 15 are provided, each for example arranged inside loop 12 and outside wristband 4. In order to do this, strand 4 of the wristband includes at least one protruding portion 13 on the side of the wristband, and the loop includes at least one inner recess 15. Since loop 12 is generally made of a flexible material, such as rubber, it is easy to move the loop in direction F so that its recess 15 receives protruding portion 13 of the wristband. In this manner, loop 12 is in a blocking position for covering and protecting contact portions 10 and 11 from the constraints of the environment.

Preferably, loop 12 includes two opposite recesses 15 to be placed above two opposite protruding portions 13 of the wristband. Each protruding portions 13 can include inclined planes on each side in order to place easily the loop in a blocking position.

In another embodiment of the instrument not illustrated, the loop can include at least one protruding portion in order to be placed in a blocking position in at least one recess of the wristband.

When portable instrument 1 is worn on the user's wrist, one end of strand 5 passes through loop 12. Thus, an inner surface of loop 12 is pressed in the direction of the conductive pots or sockets to ensure better insulation.

In an embodiment that is not illustrated, loop 12 can be provided with a hollow portion opening on the side of the protruding portion of the wristband in order to cause the hollow portion of the loop to slide onto the protruding portion until the blocking position is reached.

Figure 2A:
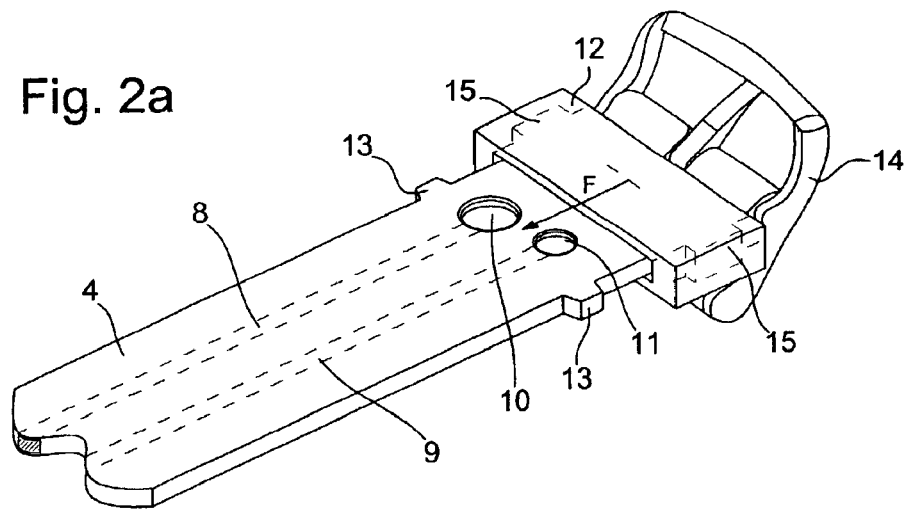
FIG. 2a shows, in a three-dimensional view, a strand of a wristband of the instrument according to the invention, in which the protective loop for the contact portions is free of movement.

FIG. 2a shows in more detail a three-dimensional view of strand 4 of the wristband. This Figure shows loop 12 free of movement abutting against buckle 14. Loop 12 can be moved between the zones of contact portions 10 and 11 and buckle 14 which prevents loop 12 from escaping when the wristband is assembled with the case of the instrument. The instrument wristband can also include a second loop that is not illustrated, in the event that the first loop is not sufficient to hold the second strand of the wristband.

Figure 2B:
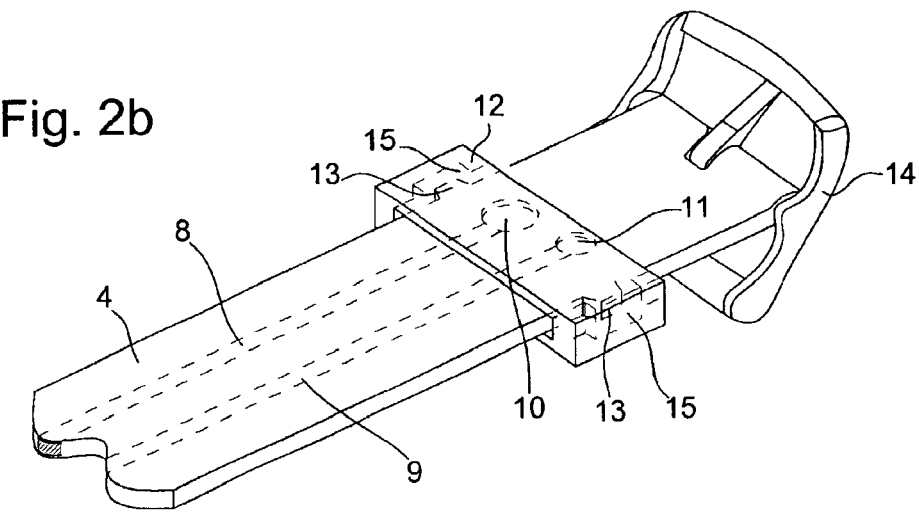
FIG. 2b shows, in a three-dimensional view, a strand of a wristband of the instrument according to the invention, in which the protective loop occupies a blocking position above the contact portions.

FIG. 2b shows in more detail a three-dimensional view of strand 4 of the wristband when the loop occupies its blocking position above contact portions 10 and 11. In this Figure one can see the two protruding portions 13 enclosed in the two recesses 15 of loop 12.

From the description that has just been made, those skilled in the art can conceive multiple variants of the instrument and wristband without departing from the scope of the invention defined by the claims. For example, contact portions 10 and 11 of strand 4 of the wristband, can be two metallic pins protruding for example from the surface of the wristband. Thus, the charger has to include two conductive pots or sockets for connection to the wristband pins for recharging the power source. The wristband pins can also be used as blocking elements for the loop that covers them.

The electric connection means can also be made in a different way from a solely resistive connection between the contact portions and the power source.

The two contact portions may also be each arranged on a different face of wristband strand 4 or on the same external face. These contact portions can be only contact surfaces on the wristband. Moreover, the wristband can include only a single strand or be formed of links. In the latter case, a strip carrying the metallic paths has to pass through each link of the wristband while ensuring that the metallic paths connecting the power source are insulated.

What is claimed is:

1. A portable instrument with a wristband, including an electronic circuit and a rechargeable power source for supplying the electronic circuit with electricity, the wristband including two distinct electric contact portions arranged on a same strand of the wristband and means for electrically connecting the electric contact portions to the power source, the two electric contact portions being intended to be placed on two complementary conductive portions of an electric charger to allow the power source to be recharged, wherein it includes a loop able to be moved on the wristband and able to occupy a blocking position above the electric contact portions to cover them and protect them.

2. The portable instrument according to claim 1, wherein the electronic circuit and/or the power source are integrated in the wristband.

3. The portable instrument according to claim 1, wherein the electric contact portions are two conductive socket means housed in the thickness of the wristband.

4. The portable instrument according to claim 3, wherein the two conductive socket means have a different contact section in order to act as a foolproof device during connection to the complementary portions of a charger.

5. The portable instrument according to claim 1, the wristband including two strands, wherein the loop can be freely moved on the first strand and occupy the blocking position by covering the electric contact portions, and wherein the free end of the second strand of the wristband can be inserted in the loop for pressing an inner surface of the loop in the direction of the electric contact portions in order to protect said electric contact portions.

6. The portable instrument according to claim 5, wherein the wristband and the loop include complementary blocking elements in order to allow the loop to be blocked in its blocking position to cover and protect the electric contact portions.

7. The portable instrument according to claim 1, wherein the connection means are two conductive paths, which are each connected to a respective contact portion and which arranged within a single strand of the wristband, the conductive path passing through a case of the instrument to connect the two poles of the power source housed in the case.

8. A wristband for the portable instrument according to claim 1, the wristband including the two electric contact portions arranged on said same strand in order to be able to be placed on the complementary portions of the charger, wherein the wristband includes the loop able to be moved on the wristband and able to occupy the blocking position above the electric contact portions to cover them and protect them.

* * * * *